(12) United States Patent
Phillips

(10) Patent No.: US 8,414,072 B2
(45) Date of Patent: Apr. 9, 2013

(54) COLLAPSIBLE HANGING CHAIR

(76) Inventor: David Phillips, Renfrew, PA (US)

( * ) Notice: Subject to any disclaimer, the term of this patent is extended or adjusted under 35 U.S.C. 154(b) by 264 days.

(21) Appl. No.: 12/930,680

(22) Filed: Jan. 13, 2011

(65) Prior Publication Data
US 2011/0254334 A1 Oct. 20, 2011

Related U.S. Application Data

(60) Provisional application No. 61/335,930, filed on Jan. 13, 2010.

(51) Int. Cl.
A63G 9/14 (2006.01)
A47C 3/00 (2006.01)

(52) U.S. Cl.
USPC .......................................... 297/273; 297/277

(58) Field of Classification Search .................. 297/273, 297/277, 280, 281; 472/118
See application file for complete search history.

(56) References Cited

U.S. PATENT DOCUMENTS

| 472,351 | A | * | 4/1892 | Higham | 297/277 |
| 491,172 | A | * | 2/1893 | Hart | 297/276 |
| 737,176 | A | * | 8/1903 | Vaughan | 297/78 |
| 2,317,243 | A | * | 4/1943 | Anderegg | 297/280 |
| 5,704,882 | A | * | 1/1998 | Coates et al. | 297/273 |
| 5,876,311 | A | * | 3/1999 | Coates et al. | 297/274 |
| 6,854,801 | B2 | * | 2/2005 | Nussbaum | 297/279 |
| 7,380,880 | B2 | * | 6/2008 | Molen | 297/273 |

* cited by examiner

Primary Examiner — Peter R. Brown
(74) Attorney, Agent, or Firm — Anthony J. Serventi

(57) ABSTRACT

Disclosed herein is a collapsible hanging chair which may be transported easily into remote areas and attached to any substantially vertical support, such as a tree or a telephone pole. The collapsible hanging chair of the present invention may be attached to a swivel for 360° rotation and visibility. A series of cords connected to the seat support springs provide for suspension of the collapsible hanging chair and combine with the springs to provide shock absorption and balancing as the user sits and rotates in the chair.

3 Claims, 3 Drawing Sheets

COLLAPSIBLE HANGING CHAIR

CROSS-REFERENCING TO RELATED APPLICATIONS

This application claims the benefit of U.S. Provisional Application No. 61/335,930, filed on Jan. 13, 2010, which is hereby incorporated herein by reference in its entirety.

FIELD OF THE INVENTION

The instant invention relates generally to a hanging chair for use during hunting or other outdoor activities. More specifically, the invention relates to a collapsible hanging chair having optimal rotation capability, adjustability and comfort for the user.

BACKGROUND

A great many devices have been developed to assist hunters. Those devices include various tree stands and support assemblies such as those disclosed in U.S. Pat. No. 5,263,675 issued to Roberts et al. on Nov. 23, 1993, U.S. Pat. No. 5,363,941 issued to Richard on Nov. 15, 1994, U.S. Pat. No. 6,945,361 issued to Hedgepeth on Sep. 20, 2005 and U.S. Pat. No. 6,722,472 issued to Berkbuegler on Apr. 20, 2004. A great many devices have also been developed to provide comfort to a person sitting in a seat. Those devices include various hanging chairs, swings, baskets and hammocks such as those disclosed in U.S. Pat. No. 5,788,327 issued to Gregory on Aug. 4, 1998, U.S. Pat. No. 5,944,382 issued to Nguyen on Aug. 31, 1999 and U.S. Pat. No. 5,851,053 issued to Crawford on Dec. 22, 1998.

Currently there exists a need for a portable hanging chair for use during hunting or other outdoor activities, which provides the user with optimal rotation capability, adjustability, accessibility and comfort. The present invention overcomes the deficiencies of prior art using a novel hanging and seat design which allows the user to collapse the device for transport and easily affix the device to any tree or other substantially vertical support.

SUMMARY OF THE INVENTION

Disclosed herein is a portable hanging chair and chair support which may be attached to any substantially vertical support, such as a tree or a telephone pole. Preferably, the portable hanging chair of the present invention is attached to a swivel attached to the chair support for 360° rotation and visibility. Also, disclosed herein is a seat support, comprising an L-shaped chair support, a brace and at least one ratchet strap for attaching the seat support to a vertical support securely and quickly. Preferably, springs are incorporated into specific parts of the device for comfort. A chair support spring may be set onto a chair support hook located at the distal end of the chair support relative to the vertical support. The L-shaped chair support may be a single continuous component or two independent components, a vertical support bar and a horizontal support bar, hingeably attached to allow the L-shaped chair support to collapse into a more easily transported unit.

A chair frame support bar may be attached to the chair support spring by, wherein the bar swivel of the chair bar is attached to the chair support spring directly or utilizing a rope, cord or other flexible securing medium. At least one stabilization cord may secure the distal end of the chair support bar relative to the chair hook. Preferably, first stabilization cord secures the chair hook to a first distal end of the chair bar and a second stabilization cord secures the chair hook to a second distal end at the opposing side. In another embodiment, the stabilization cords are secured to any point on the chair support spring or a cord extended from the chair support spring to the chair bar. To attach the stabilization cords to the chair bar, the chair bar may be equipped with hooks securely attached to the top or side of the chair bar or the chair bar may be provided with holes through which the cords are tied. To secure the stabilization cords, an O-ring is rotatably attached to the chair hook and the stabilization cords are attached to the O-ring. As the chair bar rotates horizontally via the bar swivel, the stabilization cords rotate horizontally via the O-ring which allows the stabilization cords and chair bar to be maintained in substantially the same plane.

Disclosed herein is a collapsible hanging chair hanging chair for use during hunting or other outdoor activities, the collapsible hanging chair of the present invention having optimal rotation capability, adjustability and comfort for the user. The collapsible hanging chair of the present invention comprises a chair frame support bar having a first distal end, a second distal end, a top side, a bottom side and a medial point. A first end of a first stabilizing cord is secured to the first distal end of the chair frame support bar and a first end of a second stabilizing cord is secured to the second distal end of the chair frame support bar. The chair frame support bar connects to a chair support spring attached to a horizontal support member via the first and second stabilizing cords. An O-ring is rotatably attached to the chair support spring and a second end of the first stabilization cord is attached to the O-ring and a second end of the second stabilization cord is attached to the O-ring providing rotation of the collapsible hanging chair about the vertical axis of the chair support spring.

A first seat support spring is attached to the bottom side of the first distal end of the chair frame support bar and a second seat support spring is attached to the bottom side of the second distal end of the chair frame support bar. A series of cords connected to the seat support springs provide for suspension of the collapsible hanging chair and combine with the springs to provide shock absorption as the user sits in the chair.

A first end of a first seat support cord is secured to the first seat support spring and a first end of the second seat support cord is secured to the second seat support spring. A second end of the first seat support cord is attached to a first end of the first rear side support cord and a first end of the first front support cord and a second end of the first rear side support cord is secured to the first rear side of the seat. A second end of the first front support cord is attached to the first front side of the seat. A second end of the second seat support cord is attached to a first end of the second rear side support cord and a first end of the second front side support cord. A second end of the second rear side support cord is secured to the second rear side of the seat and a second end of the second front support cord is attached to the second front side of the seat.

A first end of the first back support cord is secured to the first seat support spring and a second end of the first back support cord is secured to the first rear side of the seat. A first end of the second back support cord is secured to the second seat support spring and a second end of the second back support cord is secured to the second rear side of the seat.

The collapsible hanging chair of the present invention may further comprise a chair frame support bar hook secured to the medial point, said chair frame support hook secured to a swivel about the vertical axis of the medial point, said swivel attached to the top side of the chair frame support bar. In this embodiment, a chair frame support hook cord connects the chair frame support hook to the chair support spring.

Preferably, the collapsible hanging chair of the present invention further comprises a back having a first side and a second side, the first side of the back secured to the first back support cord and the second side of the back secured to the second back support cord.

BRIEF DESCRIPTION OF THE DRAWINGS

In order to assist in the understanding of the various aspects of the present invention and various embodiments thereof, reference is now made to the appended drawings, in which like reference numerals refer to like elements. The drawings are exemplary only, and should not be construed as limiting the invention.

DETAILED DESCRIPTION OF EMBODIMENTS OF THE INVENTION

Figure 2:
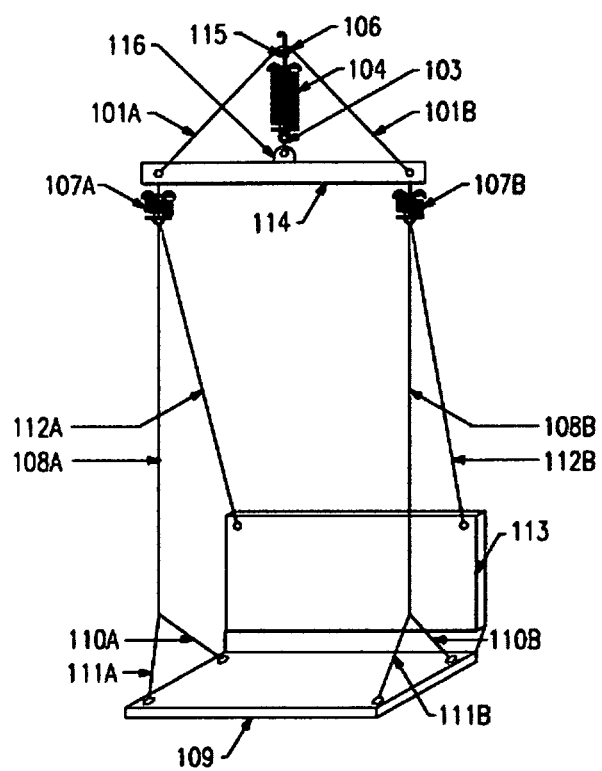
FIG. 2 is a front perspective view of an embodiment of a hanging chair of the present invention, wherein the stabilization cords and springs are illustrated.
Figure 3:
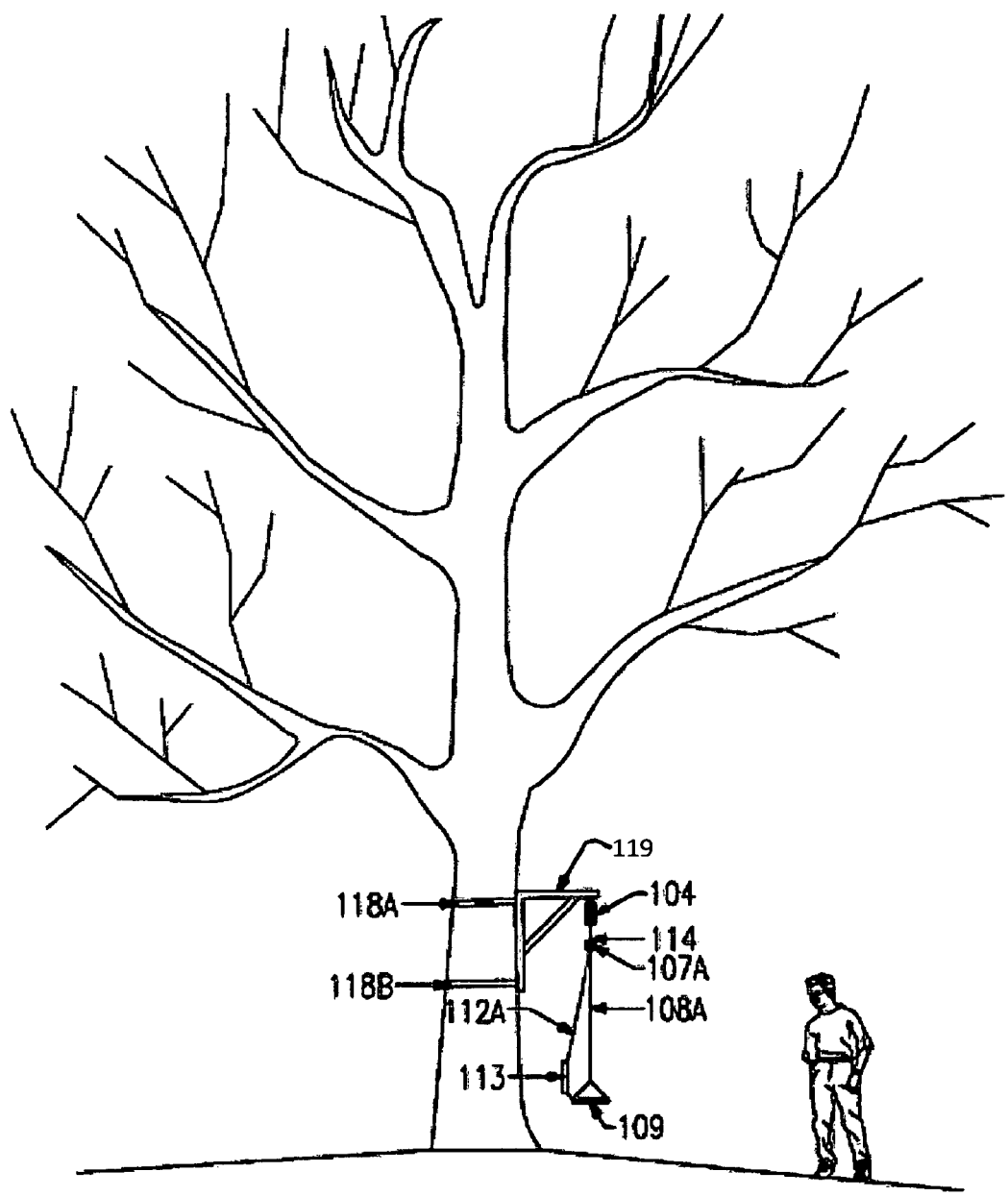
FIG. 3 is a side perspective view of an embodiment of a hanging chair and chair support of the present invention, wherein the invention is adapted to connect to a tree.

The collapsible hanging chair, generally referred to as 100 in FIGS. 2 and 3, described herein provides a collapsible hanging chair which may be transported easily into remote areas and attached to any substantially vertical support, such as a tree or a telephone pole. Preferably, the collapsible hanging chair of the present invention is attached to a swivel attached to the chair support for 360° rotation and visibility. A series of cords connected to the seat support springs provide for suspension of the collapsible hanging chair 100 and combine with the springs to provide shock absorption and balancing as the user sits and rotates in the chair.

Figure 1:
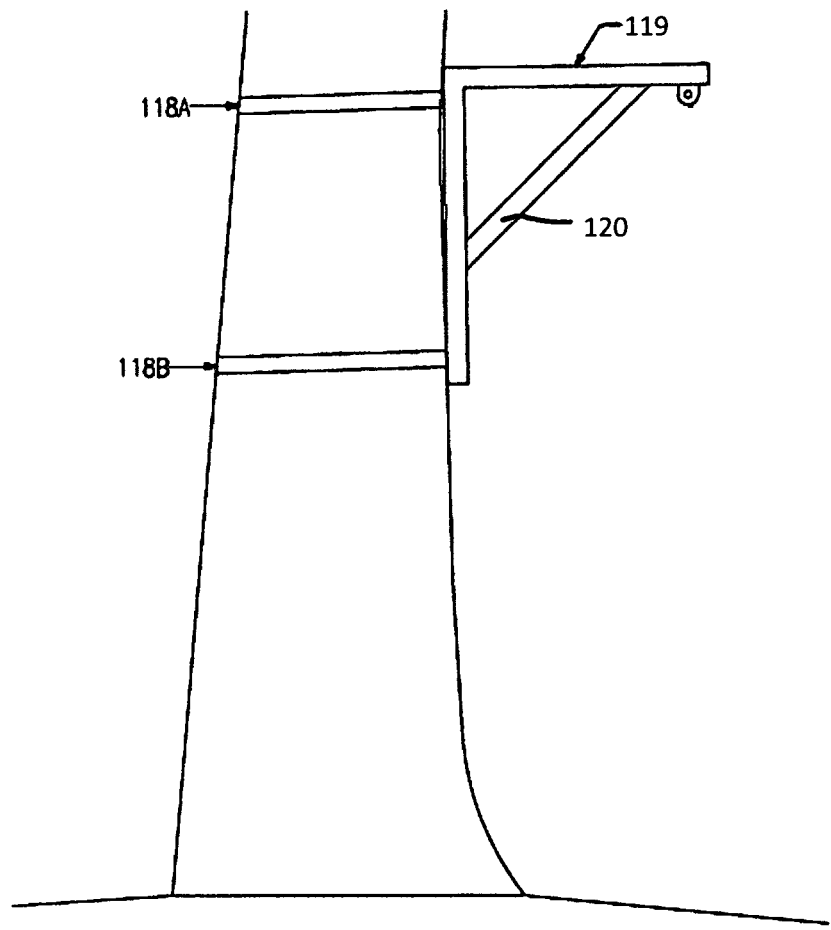
FIG. 1 is a side view of the chair support of the present invention.

Referring to FIGS. 1 through 3, the collapsible hanging chair 100 described herein preferably comprises a chair frame support bar 114, which suspends the collapsible hanging chair from a chair support spring with various cords and springs. The chair frame support bar 114 has a first distal end, a second distal end, a top side, a bottom side and a medial point. Preferably, the chair frame support bar 114 is essentially rectangular in shape, although other shapes may be utilized without departing from the scope and spirit of the present invention. The chair support bar may be constructed of any strong lightweight material which is capable of supporting the load applied to the seat. Examples of such material are plastics and aluminum. Although heavier materials may be used, such heavier materials may impact the ability of the user to transport the device.

A first end of a first stabilizing cord 101A is secured to the first distal end of the chair frame support bar 114 and a first end of a second stabilizing cord 101B is secured to the second distal end of the chair frame support bar 114. Each of the first and second stabilizing cords 101A and 101B may be secured by any securing means. As shown in FIG. 2, the first and second stabilizing cords 101A and 101B may be secured by tying each stabilizing cord 101A and 101B through a hole bored through each distal end of the chair frame support bar 114. As an alternative, the holes may be bored from top to bottom of the chair frame support bar 114 or the stabilizing cords 101A and 101B may be tied to hooks or loops attached to the chair frame support bar 114.

The chair frame support bar 114 connects to a chair support spring 104 attached to a horizontal support member 115 via the first and second stabilizing cords 101A and 101B. An O-ring 106 is rotatably attached to the chair support spring 104 and a second end of the first stabilization cord 101A is attached to the O-ring 106 and a second end of the second stabilization cord 101B is attached to the O-ring 106 providing rotation of the collapsible hanging chair 100 about the vertical axis of the chair support spring 104. An L-shaped chair support 119, a brace 120 and at least one ratchet strap 118A and 118B may be used for attaching the seat support to a vertical support, such as a tree illustrated in FIG. 1, securely and quickly. A chair support spring 104 may be set onto a chair support hook located at the distal end of the chair support relative to the vertical support.

The chair frame support bar 114 may be connected to the chair support spring 104 using a cord or bar 116. The length of the first and second stabilization cords 101A and 101B, as well as the cord or bar connecting the chair support spring 104 to the chair frame support bar 114, is preferably adjusted to keep the user balanced as the user rotates within the chair 100. As such, the length of each of the first and second stabilization cords 101A and 101B is preferably adjustable by using any cord adjusting means, such as a clip or ratchet.

A first seat support spring 107A is attached to the first distal end of the chair frame support bar 114 and a second seat support spring 107B is attached to second distal end of the chair frame support bar 114. As shown in FIG. 2, the first and second support springs 107A and 107B are attached to the bottom on the chair frame support bar 114. The first and second support springs 107A and 107B may be attached using any attaching means, such as hooks, welding or epoxy. A first end of a first seat support cord 108A is secured to the first seat support spring 107A and a first end of the second seat support cord 108B is secured to the second seat support spring 107B. The first and second seat support cords 108A and 108B may be secured by tying or any other securing means. A second end of the first seat support cord 108A is attached to a first end of the first rear side support cord 110A and a first end of the first front support cord 111A and a second end of the first rear side support cord 110A is secured to the first rear side of the seat 109. A second end of the first front support cord 111A is attached to the first front side of the seat 109. A second end of the second seat support cord 108B is attached to a first end of the second rear side support cord 110B and a first end of the second front side support cord 111B. A second end of the second rear side support cord 110B is secured to the second rear side of the seat 109 and a second end of the second front side support cord 111B is attached to the second front side of the seat 109.

A first end of the first back support cord 112A is secured to the first seat support spring 107A and a second end of the first back support cord 112A is secured to the first rear side of the seat 109. A first end of the second back support cord 112B is secured to the second seat support spring 107B and a second end of the second back support cord 112A is secured to the second rear side of the seat 109.

The collapsible hanging chair 100 of the present invention may further comprise a chair frame support bar hook secured to the medial point of the chair frame support bar 114, said chair frame support hook 116 secured to a swivel 103 about the vertical axis of the medial point. Preferably, the swivel 103 attached to the top side of the chair frame support bar 114. In this embodiment, a chair frame support hook cord connects the chair frame support hook to the chair support spring.

Preferably, the collapsible hanging chair 100 of the present invention further comprises a back 113 having a first side and a second side, the first side of the back secured to the first back support cord 112A and the second side of the back secured to the second back support cord 112B.

The various cords described above may be constructed of any strong lightweight material, such as rayon or nylon. Further, it is understood that the term "cords" may refer to straps, ropes or chains. As an alternative, the cords may be metal chains to provide load bearing capability, but the use of chains adds overall weight to the hanging chair and, as a result, is less preferred. Preferably, the seat and back are each constructed from a light, flexible, water-resistant material, such as polytetrafluoroethylene.

As the chair frame support bar 114, the first stabilizing cord 101A and the second stabilizing cord 101B are disconnected from the chair support spring and O-ring, the user is able to set the hanging chair onto the ground or floor and the hanging chair of the present invention collapses into a portable package which may be transported into remote areas quickly and easily.

While the invention has been illustrated in detail in the drawings and the foregoing description, the same is to be considered as illustrative and not restrictive in character as the present invention and the concepts herein may be applied to any battery pack or battery system. It will be apparent to those skilled in the art that variations and modifications of the present invention can be made without departing from the scope or spirit of the invention. Thus, it is intended that the present invention cover all such modifications and variations of the invention that come within the scope of the appended claims and their equivalents.

I claim:

1. A collapsible hanging chair comprising:
   a chair frame support bar having a first distal end, a second distal end, a top side, a bottom side and a medial point;
   a first stabilizing cord and a second stabilizing cord, wherein a first end of the first stabilizing cord is secured to the first distal end of the chair frame support bar and wherein a first end of second stabilizing cord is secured to the second distal end of the chair frame support bar;
   a chair support spring attached to a horizontal support member;
   an O-ring rotatably attached to the chair support spring, wherein a second end of the first stabilization cord is attached to the O-ring and a second end of the second stabilization cord in attached to the O-ring
   a first seat support spring attached to the first distal end of the chair frame support bar and a second seat support spring attached to the second distal end of the chair frame support bar;
   a first seat support cord and a second seat support cord, wherein the first end of the first seat support cord is secured to the first seat support spring and wherein a first end of the second seat support cord is secured to the second seat support spring;
   a seat having a top, a bottom, a front side, a rear side, a first side and a second side;
   a first rear side support cord and a first front side support cord, wherein a second end of the first seat support cord is attached to a first end of the first rear side support cord and a first end of the first front support cord, wherein a second end of the first rear side support cord is secured to the first rear side of the seat and wherein a second end of the first front support cord is attached to the first front side of the seat;
   a second rear side support cord and a second front side support cord, wherein a second end of the second seat support cord is attached to a first end of the second rear side support cord and a first end of the second front side support cord wherein a second end of the second rear side support cord is secured to the second rear side of the seat and wherein a second end of the second front support cord is attached to the second front side of the seat; and
   a first back support cord and a second back support cord, wherein a first end of the first back support cord is secured to the first seat support spring and a second end of the first back support cord is secured to the first rear side of the seat and wherein a first end of the second back support cord is secured to the second seat support spring and a second end of the second back support cord is secured to the second rear side of the seat.

2. The collapsible hanging chair of claim 1 further comprising a chair frame support bar hook secured to the medial point, said chair frame support hook secured to a swivel about the vertical axis of the medial point, said swivel attached to the top side of the chair frame support bar.

3. The collapsible hanging chair of claim 1 further comprising a back having a first side and a second side, the first side of the back secured to the first back support cord and the second side of the back secured to the second back support cord.

* * * * *